July 10, 1928.
G. H. PHELPS
1,676,282
ELECTRIC WELDING
Filed March 5, 1927
2 Sheets-Sheet 1
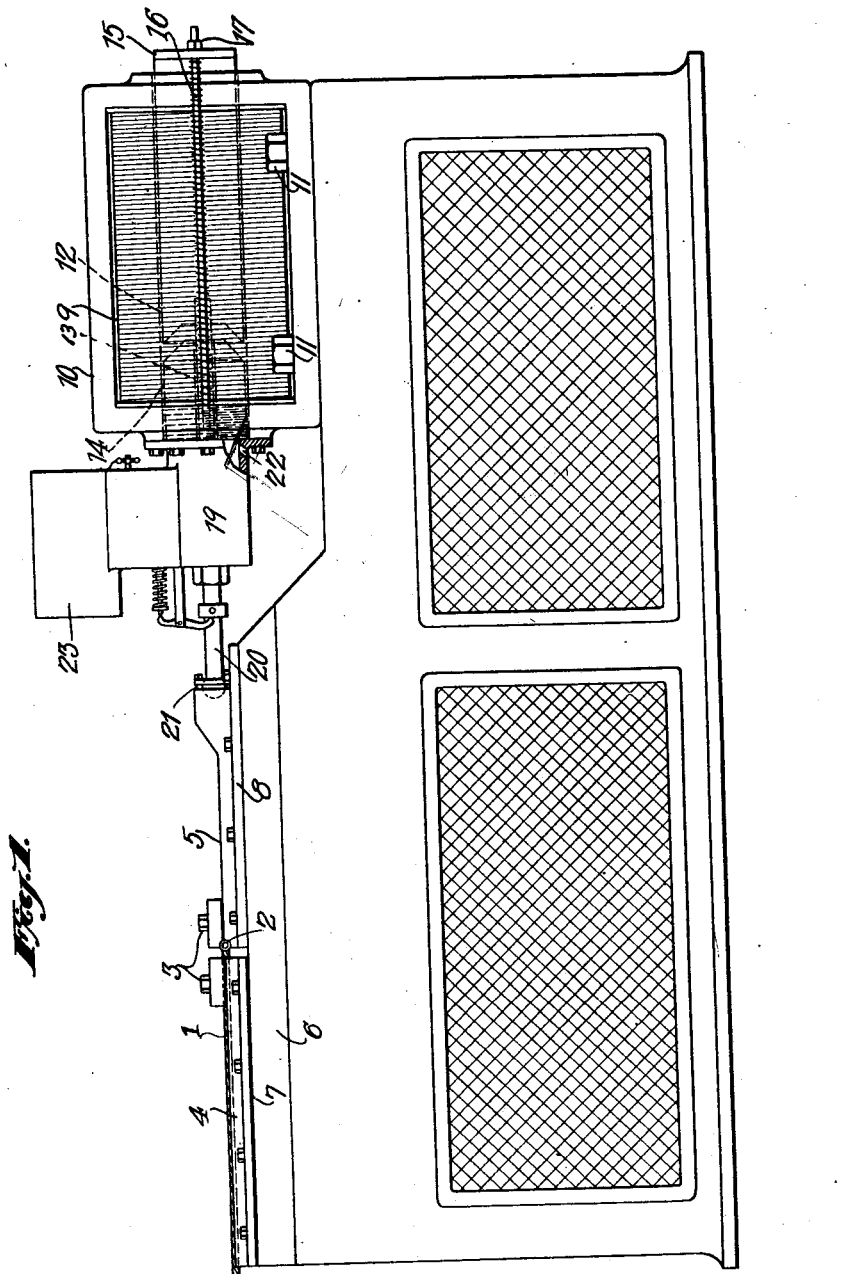
INVENTOR
GEORGE H. PHELPS.
BY
ATTORNEY July 10, 1928.  
G. H. PHELPS  
ELECTRIC WELDING  
Filed March 5, 1927  
1,676,282  
2 Sheets-Sheet 2
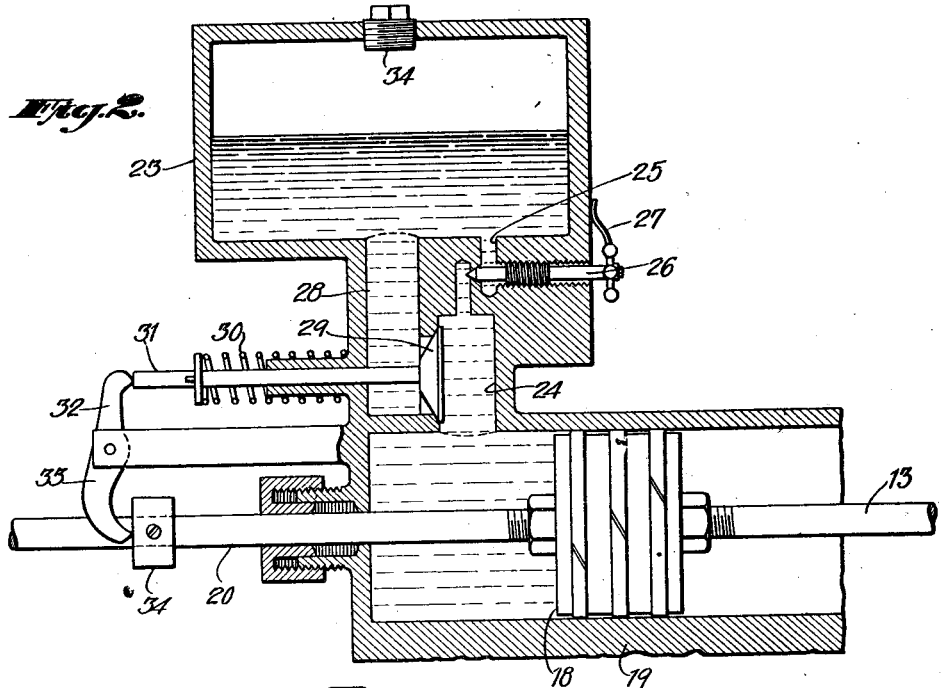
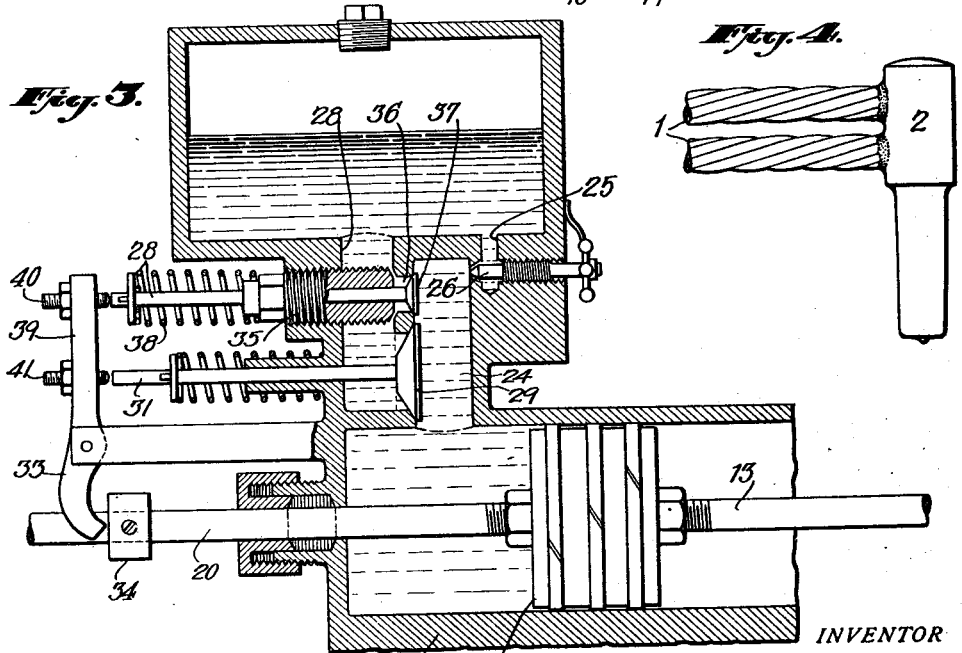
INVENTOR  
GEORGE H. PHELPS.  
BY  
ATTORNEY Patented July 10, 1928.

1,676,282

UNITED STATES PATENT OFFICE.

GEORGE H. PHELPS, OF WAREHOUSE POINT, CONNECTICUT, ASSIGNOR TO THOMAS E. MURRAY, OF BROOKLYN, NEW YORK.

ELECTRIC WELDING.

Application filed March 5, 1927. Serial No. 172,963.

My invention aims to provide an improved apparatus and method of control in certain classes of electric welding operations.

The accompanying drawings illustrate embodiments of the invention.

Fig. 1 is a side elevation of a welding machine;

Fig. 2 is a longitudinal section of certain controlling means;

Fig. 3 is a similar view of a modification;

Fig. 4 is a side elevation of a piece of work welded in the machine.

In resistance butt welding and similar classes of electric welding, it is sometimes advantageous to use different degrees of pressure on the work in the course of making a single weld, or to use different speeds of take-up or travel of the welding head, in the course of a single weld. It is difficult to get a wide difference in the pressures or speeds. The apparatus illustrated is designed to secure simply and automatically differences of pressure and of speed, which differences can be as great as is desired, and to get such differences even in very rapid welding.

One defect in previous schemes has been their failure to permit the building up and exerting of the heavy pressure suddenly enough to get its effect before the weld is virtually completed. This difficulty may be avoided by the machine illustrated.

The improvement is particularly useful in connection with the Murray fast welding method, described in the reissue Patent No. 15,466 of October 10, 1922, in which a current of extremely high density is applied for a very brief regulated period of time, which may be in fact a fraction of a second.

Referring to the particular embodiment of the invention illustrated, the two pieces to be welded, 1 and 2, are clamped by bolts 3 on a fixed head 4 and a movable head 5 respectively. These heads are mounted on the frame 6 of the machine, an insulating plate 7 being interposed under the fixed head, and gibs 8 serving as slideways for the movable head 5. The parts 1 and 2 are pressed into contact, a welding current is passed across the joint and the movable head is advanced to take up the metal as it softens. The welding and controlling circuits may be of any ordinary design and are, therefore, not illustrated.

The advance of the head 5 is effected by a pressure magnet 9, or solenoid, in a frame 10 mounted on the machine frame by bolts 11. The plunger 12 of the magnet carries a projecting piston rod 13 of non-magnetic material which passes through the magnet plug 14, which latter is screwed to the magnet frame 10. The rear end of the plunger 12 carries a cross-head 15 against the opposite lateral projecting ends of which two compressed springs 16 bear to retract the plunger and hold the cross-head 15 against nuts 17 on the ends of rods which pass through the springs.

The piston rod 13 carries a piston 18 moving in a cylinder 19. The piston rod has an extended forward portion 20 passing through the head of the cylinder and connected through a joint 21 to the sliding pressure head 5. The joint is preferably flexible to avoid the necessity of accurately lining up the parts, though this is rather a convenience than a necessity. A vent 22 is provided in the back end of the cylinder to permit the free return of the piston and to permit the escape of any oil which leaks past the piston and its packing rings.

The pressure magnet acts with a very quick and powerful stroke and with the maximum pressure required during the welding. Its direct connection to the pressure head ensures an equally quick movement of the latter.

The cylinder carries in its forward end a body of oil which extends up through certain ports into a reservoir 23. There are two paths leading from the cylinder to the reservoir. A chamber or passage 24 leads to an opening 25 in the reservoir past a needle valve 26 which is threaded to permit fine adjustment and carries a pointer 27 to indicate its position. Normally the valve 26 is open to such an extent as to determine a comparatively slow application of pressure and speed to the welding head by absorbing a large part of the pressure of the magnet in the effort of the piston to force the oil through the restricted passage.

The cylinder also communicates with the reservoir through a larger opening 28. The passage is normally closed by a poppet valve 29 which is pressed against its seat by a spring 30 engaging a shoulder on the external stem 31. The opening provided by this valve permits a very much more rapid movement of the piston and the welding head and may be so large as to oppose practically no resistance; thus permitting the full pressure and speed of the magnet to be communicated to the work.

The valve 29 is opened at a determined point in the operation by a simple tripping device. A lever pivoted at a fixed point beyond the end of the cylinder has one arm 32 bearing on the end of the valve stem 31 and another arm 33 which lies in the path of the adjustable shoulder 34 on the rod 20. When this shoulder strikes the arm 33 and opens the valve 29 the pressure magnet acts instantly and powerfully to force the welding head forward to the end of the stroke.

When the current is cut off from the magnet, and the core of the latter is pressed back by the springs, the piston returns easily, suction serving to open the valve 29 sufficiently for movement. The reservoir 23 is supplied with oil or other liquid as may be needed through an opening at the top closed by a plug 34.

More than two speeds may be obtained by using additional valves, the opening of each valve in turn allowing more rapid motion of the piston and welder head. Or, if desired, these changes or any part of them can be reversed by closing a valve instead of opening one.

An apparatus of this character is illustrated in Fig. 3. Here the passage 24 communicates with the passage 28 through two valves. Besides the valve 29, above referred to, which gives practically complete relief, there is an adjustable valve to give an intermediate degree of relief (and pressure.) A sort of needle valve 35 is threaded and adjustable toward and from the opening 36 between the two passages 24 and 28. A poppet valve 37 closes the same port 36, being held to its seat by the outside spring 38 surrounding the stem of the valve. The controlling lever in this case has an arm 39 with two adjustable stops thereon, 40 and 41.

When the collar 34 on the rod 20 strikes the arm 33, the poppet valve 37 is pushed open and the resistance to the advance of the piston is diminished to the extent of the opening regulated by the valve 35, the pressure and speed of the welding head being correspondingly increased. This condition continues until the stop 41 strikes the stem 31 of the largest valve and provides complete or substantially complete relief.

The control effected is directly on the piston and pressure magnet, by absorbing a part of this pressure, leaving only the balance of the pressure effective on the welding head 5. If the metal of the work is hard enough at any instant it may also serve to diminish the rate of advance or take-up of the work. Where a high current density across the joint is effective, so that softening of the metal at the joint is practically instantaneous, the means for controlling the pressure is practically the only control of the rate of take-up. The opening effected by the valve 29, in the last stage of the operation, may also be regulated to absorb a part of the pressure on the piston and thus determine the maximum speed; though it is preferable to make this opening so large as to remove practically all resistance, regulating the pressure at this stage of the weld by adjusting the strength of the pressure magnet itself.

By varying the absolute and relative sizes of the openings controlled by the several valves, the rate of take-up can be varied, either so as to make it virtually constant throughout or so as to secure any desired combination of early and late speeds.

A special application of the mechanism, and that for which I anticipate it will be most frequently used, is that in which the early rate of travel is so slow as to cause a pressure which is abnormally low, and in some cases is practically zero. This method is covered in a previous application of mine No. 732,768, filed August 18, 1924. It is the method which I have used with success in welding the ends of cables 1 (Fig. 4) against the convex side of a cylindrical terminal 2 to form a rail bond. The result is a flash weld, or a combination of flash and butt weld, depending on the valve openings and their timing and on whether the welding current is cut off with the application of the heavy pressure or whether butt welding with the current continued proceeds under this heavy pressure for a time.

In making flash welds the welding current is applied at the same time that the pressure magnet is energized. During the fraction of a second in which pressure is building up in the magnet, the welding current is burning or flashing (by a series of small arcs) the ends of the work pieces which touch each other at their high points of contact. The welding head is then moved forward slowly because of the slight opening of the needle valve 26, moving rapidly enough to apply no substantial pressure to the work, the contact faces of which are being flashed or burned away as fast as they are being fed. If the welding current be then discontinued, the large poppet valve being open, the heavy pressure will merely complete what I have called the "flash weld". But assuming the welding current to continue, the opening of the poppet valve will release the pressure and a rapid take-up will occur which instantaneously forces the heated ends of the work together and forms the weld under the ordinary heavy pressure butt welding conditions.

The described method of flash welding followed by butt welding has been used with great success and uniformity of product on fast welding occupying from ¼ to ½ of a second. The same controlling mechanism has been used for slower welding in which there were varying proportions of flash and butt operations, from no flash and all butt to no butt and all flash. In every case the regulation of the apparatus is easy to accomplish and the performance is very uniform. We have been unable to detect any measurable variation in a set of fifteen consecutive autograph records of the time taken to travel one-half inch at the slow rate, that is under the low pressure setting.

The apparatus for measuring these tests is capable of detecting differences as small as .01 of a second, and the time measured in this series of tests was 0.75 of a second.

A common method of making flash welds has involved the moving of the welding head by means of a power driven cam. This has objections in the necessity of determining the proper shape of cam for each job by trial and that changes in line voltage, character of metal to be welded etc. can be compensated for only by changing the cam or its speed of revolution.

I have endeavored to secure the desired control by the method described in the Holmes Patent No. 1,523,593 of January 20, 1925, using a pressure magnet and varying the current impressed on it at different points in the course of the operation. With all such apparatus it has been difficult to secure an absolutely uniform control, and to change from one pressure to another sufficiently quickly. In making welds within a fraction of a second it was found difficult to apply the heavy pressure suddenly enough to make it effective before the weld was finished.

With the present apparatus I do not have to generate or build up the high pressure. I have a high pressure at hand throughout the operation, held in check during the flashing period and then suddenly released when desired.

This is accomplished easily and with very uniform action. There is no gradual variation or shading from one pressure to another but a definite and practically constant pressure at one stage and a sudden change to another pressure, which again remains constant for a determined period, and so on.

The apparatus shown is practically universally adjustable for a great variety of welds. Where it is to be used on one particular welding operation, the ports may be of fixed size and the machine simplified to this extent. Assuming that we desire the full pressure of the magnet when the poppet valve is open, the magnet must then be regulated to produce the pressure desired and this may be done by any usual or suitable adjusting means such as a rheostat in the circuit of the magnet. The full magnet pressure accomplishes a considerable amount of hot working of the metal as well as the forming of the weld.

Various other modifications in detail may be made by those skilled in the art without departure from the invention as defined in the following claims.

What I claim is:

1. The combination with a movable head of an electric welding machine of a magnetic device for moving said head and means for limiting the speed by absorbing a part of the presure of said device during an early part of the movement and releasing the full pressure during a later part, said device being designed to exert at all times substantially the maximum pressure required so that upon said release there is a sudden application of maximum pressure.

2. The combination with the movable head of an electric welding machine of a magnetic device for moving said head designed to exert at all times the maximum pressure required and means for retarding the speed of movement under said maximum pressure.

3. The combination with the movable head of an electric welding machine of a magnetic device for moving said head designed to exert at all times the maximum pressure required and means for retarding the speed of movement under said maximum pressure during a part of the stroke and permitting full speed during another part of the stroke.

4. The combination with the movable head of an electric welding machine of an actuating device for moving said head designed to exert at all times the maximum pressure required and means for limiting the movement to one constant speed throughout one part of the stroke and to another constant speed throughout another part of the stroke.

5. The combination with the movable head of an electric welding machine of an actuating device for moving said head at the same speed as the movable part of the actuating device and designed to exert at all times the maximum pressure required and controlling means comprising a piston operated by said actuating device, a cylinder in which said piston operates and means for maintaining a back pressure on said piston and relieving such back pressure at a determined rate.

6. The combination with the movable head of an electric welding machine of means for controlling the speed of movement, said controlling means comprising a cylinder and piston and having a passageway outside of the cylinder communicating with the forward end thereof, adjustable means for graduating the opening through said passageway and means for opening said passageway wide to permit substantially unrestricted movement of the piston.

7. The combination with the movable head of a welding machine of a magnetic device designed to act with substantially the maximum pressure required and to move said head at the same velocity as the movable part of the magnetic device, and controlling means comprising a piston actuated by said magnetic device, a cylinder carrying an incompressible liquid against which said piston acts and relief means for relieving the pressure on said liquid and permitting it to flow out of said cylinder at different certain rates which are substantially constant throughout certain portions of the movement, said relief means having a passageway which is sufficiently large to release practically the full pressure of the magnetic device, means for partially closing said passageway and means for opening said passageway fully during the end portion of the movement.

8. The combination in a welding machine of a movable head and power-actuated mechanism for advancing it with practically no pressure on the joint in the beginning, so as to flash the adjacent faces of the work, and for then advancing it under pressure to effect the weld.

In witness whereof, I have hereunto signed my name.

GEORGE H. PHELPS.